United States Patent
Illsley

(10) Patent No.: US 11,795,612 B2
(45) Date of Patent: Oct. 24, 2023

(54) AQUEOUS INK COMPOSITIONS

(71) Applicant: SUN CHEMICAL CORPORATION, Parsippany, NJ (US)

(72) Inventor: Derek Illsley, South Normanton (GB)

(73) Assignee: SUN CHEMICAL COPORATION, Parsippany, NJ (US)

( * ) Notice: Subject to any disclaimer, the term of this patent is extended or adjusted under 35 U.S.C. 154(b) by 0 days.

(21) Appl. No.: 18/021,331

(22) PCT Filed: Jul. 26, 2022

(86) PCT No.: PCT/GB2022/051951
§ 371 (c)(1),
(2) Date: Feb. 14, 2023

(87) PCT Pub. No.: WO2023/007143
PCT Pub. Date: Feb. 2, 2023

(65) Prior Publication Data
US 2023/0242782 A1   Aug. 3, 2023

(30) Foreign Application Priority Data

Jul. 30, 2021 (EP) ...................................... 21188877
Aug. 31, 2021 (GB) ...................................... 2112418

(51) Int. Cl.
*C09D 11/38* (2014.01)
*C09D 175/04* (2006.01)
*C09D 175/14* (2006.01)

(52) U.S. Cl.
CPC ............ *C09D 11/38* (2013.01); *C09D 175/04* (2013.01); *C09D 175/14* (2013.01)

(58) Field of Classification Search
CPC .... C09D 11/326; C09D 11/30; C09D 175/04; C09D 175/14; C08G 18/0823; C08G 18/12; C08G 18/6659; B41J 2/2107
See application file for complete search history.

(56) References Cited

U.S. PATENT DOCUMENTS

| | | | |
|---|---|---|---|
| 4,980,108 A * | 12/1990 | Suzuki | C08J 7/0427 427/172 |
| 7,476,705 B2 | 1/2009 | Pajerski | |
| 7,875,355 B2 | 1/2011 | Rouge et al. | |
| 8,186,822 B2 | 5/2012 | Li et al. | |
| 8,568,889 B2 | 10/2013 | Pajerski | |
| 8,931,889 B2 | 1/2015 | Roberts | |
| 9,085,707 B2 * | 7/2015 | Chevli | C09D 11/326 |
| 9,249,324 B2 | 2/2016 | Li et al. | |
| 9,255,207 B2 | 2/2016 | Berge et al. | |
| 10,076,909 B2 | 9/2018 | Gould et al. | |
| 10,457,824 B2 | 10/2019 | Kuykendall et al. | |
| 10,513,622 B2 | 12/2019 | Falkner et al. | |
| 2006/0264568 A1 | 11/2006 | Pajerski | |
| 2007/0060670 A1 | 3/2007 | Ellis | |
| 2011/0009561 A1 * | 1/2011 | Pajerski | C08G 18/4825 524/591 |
| 2018/0105710 A1 | 4/2018 | Hong | |
| 2018/0291125 A1 * | 10/2018 | Anderson | C08F 12/08 |
| 2020/0371075 A1 * | 11/2020 | Arigo | C09J 123/08 |
| 2021/0179877 A1 * | 6/2021 | Pickrell | C09D 11/38 |

FOREIGN PATENT DOCUMENTS

| | | |
|---|---|---|
| CN | 111138626 | 5/2020 |
| EP | 3390545 | 10/2018 |
| JP | 2004/149600 | 5/2004 |
| JP | 2006045334 | 2/2006 |
| JP | 2009149774 | 7/2009 |
| JP | 2012241135 | 12/2012 |
| JP | 110982344 | 4/2020 |
| WO | WO 2001036547 | 5/2001 |
| WO | WO2009/137753 | 11/2009 |
| WO | WO 2016/202654 A1 | 12/2016 |
| WO | WO2017174981 | 10/2017 |
| WO | WO 2018/138525 | 8/2018 |

OTHER PUBLICATIONS

International Search Report issued in International Application No. PCT/GB2022/051951, dated Sep. 15, 2022.
Written Opinion of the International Searching Authority issued in International Application No. PCT/GB2022/051951, dated Sep. 15, 2022.
N. Kessel et. al. (J.Coat.Technol.Res. (2008), (5), 285).

* cited by examiner

*Primary Examiner* — John Zimmermann
(74) *Attorney, Agent, or Firm* — Howard Lee; David Lazar; Luke Sande

(57) ABSTRACT

The invention provides an aqueous printing ink composition comprising a polyurethane dispersion, wherein the polyurethane of the polyurethane dispersion comprises the properties of (a) ketone or aldehyde groups present at one or more polymer chain ends; (b) a number average molecular weight ≤50,000, more preferably ≤25,000 and; (c) the content of ketone and/or aldehyde groups is in the range 0.02 to 4.0 mmol g−1, based on the dry polymer weight.

19 Claims, No Drawings

AQUEOUS INK COMPOSITIONS

CROSS REFERENCE TO RELATED APPLICATIONS

The present application is a § 371 National Phase application based on PCT/GB2022/051951 filed Jul. 26, 2022, which claims the benefit of EP 21188877.1 filed Jul. 30, 2021 and GB 2112418.5 filed Aug. 31, 2021, the subject matter of each of which is incorporated by reference in their entirety.

The present invention relates to aqueous printing ink compositions comprising polyurethane dispersions ('PUDs') which are particularly suitable as inkjet printing inks.

Advantageously, the aqueous printing ink compositions according to the present invention are water-based and comprise ≤35% (w/w) of organic co-solvents, which makes them more environmentally friendly than comparative solvent-based ink compositions comprising PUDs.

BACKGROUND OF THE INVENTION

Polyurethane dispersions (PUDs) are widely used in the preparation of printing inks. An issue with conventional PUDs, especially when used in aqueous inks for inkjet printing, is that although they can confer useful print properties such as wet rub resistance, they do not have particularly good resolubility. Resolubility of an ink is its ability to redissolve into itself or a suitable flushing solution after it is partially or fully dried. This is a useful attribute for inkjet printing as it reduces the risk of the nozzles of a printhead becoming blocked and causing printing defects or in the worst case the possible catastrophic loss of the printhead itself.

The present invention provides aqueous inks, especially aqueous inkjet printing inks, comprising a new class of self-curing PUD technology, wherein said inks are both resoluble and capable of producing water (wet rub) resistant prints. The self-curing PUDs according to the present invention have not been disclosed in the art.

Self-crosslinking PUDs and self-crosslinking styrene-acrylic dispersions (such as Daotan 7064, Joncryl FLX5000 and Joncryl FLX5060) have been referred to in the art but they have the attendant issues of poor resolubility and the potential risk of irreversibly drying and blocking printheads. The self-curing PUD technology encompassed by the present invention (which are referred to herein as 'SC-PUD') will only chain extend, without crosslinking, when combined with a difunctional co-reagent such as adipic dihydrazide. Thus, as will be understood by the skilled person and as further discussed below, the SC-PUDs disclosed herein are different from self-crosslinking PUDs described in the art.

Conventional PUDs, such as Neorez R605 and Neorez R650 also produce inks with poor resolubility/redispersibility.

The use of (low molecular weight; typically, less than 15,000 number average molecular weight) hydroxy-functional PUDs in inkjet printing inks have also been referred to in the art, but without crosslinkers such as polycarbodiimides, these do not produce resistant prints. The inventor has found that when inks are prepared using a combination of a hydroxy-PUD and a polycarbodiimide crosslinker, the ink resolubility is degraded significantly and also the prints do not develop the same degree of water (wet rub) resistance as is achievable with the current invention.

Cross-linkable PUDs have been referred to in the art, e.g., in U.S. Pat. No. 7,476,705. These are polymers incorporating cross-linkable groups, such as ketones, throughout the polymer chain (i.e., on the polymer backbone). The issue with such PUDs is that, like conventional PUDs, they have poor resolubility and since a cross-linkable PUD molecule may comprise more than two ketone groups, they run the risk of producing a crosslinked dried polymer in a printhead when crosslinked with a multifunctional crosslinker, such as adipic dihydrazide ('ADH').

Self-Crosslinking PUDs

The preparation of self-crosslinking PUDs, incorporating the keto-amine (or more commonly referred to as keto-hydrazide) self-crosslinking chemistry has been referred to in U.S. Pat. No. 8,568,889B2 and U.S. Pat. No. 7,476,705. However, these PUDs are prepared using a diol reagent bearing one or more ketone groups formed by, for example, the reaction of diepoxides and levulinic acid. Thus, any PUD would bear at least two ketone groups on the polymer backbone and where any polymer chain incorporated two or more of these diols as part of their structure it would therefore comprise four or more ketone groups in the molecular structure with the consequent risk of producing a crosslinked polymer matrix in an inkjet printhead if the ink was allowed to dry.

Aqueous Inkjet Ink Compositions Comprising Self-Crosslinkable Styrene-Acrylic Dispersions The use of self-crosslinking styrene-acrylic dispersions incorporating the keto-amine crosslinking chemistry in inkjet applications has been referred to in the art.

WO2001036547 (Coates Brothers) describes compositions comprising self-crosslinkable polymer (or oligomer) emulsions containing carbonyl groups as part of the polymeric structure, which can crosslink with adipic dihydrazide, for instance. Such polymer dispersions will have polymer molecules comprising more than two carbonyl groups as part of their molecular structure which will lead to crosslinking which is deemed undesirable in inkjet printing. The compositions further comprise what was referred to as a "resolubilizing polymer", such as a water-soluble acrylic polymer. The present inventor has found that such compositions although delivering excellent print resistance have very poor resolubility. Certainly, the innate resolubility achieved with the self-curing PUDs of the present invention is a highly beneficial aspect of the invention.

JP2006045334 (Asahi Kasei Chemical), JP2004149600 (Sharp Co.), JP2009149774 (Sakata Corp.) and JP2012241135 (General Co. Ltd.) also refer to aqueous inkjet ink compositions comprising self-crosslinking styrene-acrylic dispersions, but again these would undoubtedly have significantly poorer resolubility/redispersibility compared with inks of the current invention. CN110982344 (Zhuhai Dongchang Pigment) refers to white aqueous inkjet ink compositions comprising self-crosslinking acrylic emulsions, along with a PUD and also a further crosslinker, such as a blocked isocyanate.

The use of self-crosslinking styrene-acrylic dispersions in conventional, analogue, printing processes is well known. A good overview of the keto-amine chemistry of this type of polymer dispersion is provided by N.Kessel et. al. (J. Coat. Technol. Res. (2008), (5), 285). The polymer contains ketone, or aldehyde, groups as part of its molecular structure which can then react, upon drying, with multifunctional primary (or secondary) amines to affect the crosslinking reaction. A typical multifunctional amine used in self-crosslinking styrene-acrylic emulsions is adipic dihydrazide, although any other multifunctional amine that can react with either carbonyl or aldehyde groups may also be used.

PUDs and Crosslinkers

Polyurethane dispersions (PUDs) are seemingly the predominant resin chemistry used in the preparation of pigmented aqueous inkjet printing inks. There are several instances on the use of amino resins, such as melamine-formaldehydes, to crosslink aqueous inkjet printing inks containing PUDs, especially in the printing of textiles. WO2009/137753 (DuPont) refers to how PUDs can be crosslinked with Cymel 303, a melamine-formaldehyde crosslinker, at a temperature of 160° C. A number of other patents refer to the use of optional crosslinkers in combination with PUDs to enable improved resistance properties, including: U.S. Pat. No. 10,513,622, U.S. Pat. No. 10,457,824, U.S. Pat. No. 9,249,324, which refers to polyurethane pigment dispersants, usefully lays out the crosslinking possibilities for polyurethanes having any of carboxylic acid, hydroxyl or amine pendant functional groups. Crosslinkers include carbodiimides, epoxies, isocyanates, amino resins (e.g., melamine-formaldehyde), aziridines.

However, the advantages associated with the new class of SC-PUDs according to the present invention, especially in inkjet printing inks, has not been disclosed or alluded to. Indeed, although a large number of records discuss how to crosslink PUDs, the benefits associated with the use of the low molecular weight, ketone (or aldehyde) terminal functional self-curing PUDs of the current invention has not been disclosed.

Crosslinked PUDs

U.S. Pat. No. 8,186,822, U.S. Pat. No. 9,255,207 and US20070060670 (all DuPont), refer to aqueous inkjet ink compositions comprising crosslinked PUDs. These crosslinked PUDs are produced by inducing crosslinking during the preparation of the PUD via a crosslinking reagent such as triethylene tetramine. Such crosslinked PUDs help to improve the water and wash fastness of prints on various substrates including paper and textiles substrates. The optional use of crosslinkers of the types previously described, such as amino resins, is a further feature of these patents. Although helping to improve the print resistance, it is likely that if such crosslinked PUDs were used in ink compositions where the concentration of co-solvents, such as propylene glycol, was less than 30% (w/w) of the ink composition, then the resolubility/redispersibility of the inks would be poor.

Resoluble, Crosslinking PUD Technologies

Recently, the use of acrylated polyurethane dispersions ('Ac-PUDs') in the preparation of UV-, and EB-curable aqueous inkjet printing compositions has been referred to, for example in U.S. Pat. No. 10,076,909 (Fujifilm), EP3390545 (Fujifilm), WO2017174981 (Fujifilm) and WO2018138525 (Fujifilm). The crosslinking of these Ac-PUDs is induced by using a suitable photoinitiator in the case of UV-curing. Such Ac-PUDs can produce inks with good resolubility/redispersibility but the use of photoinitiators can pose a risk of unwanted migration of low molecular weight compounds from a cured ink, which would be undesirable in many applications, especially the printing of food packaging. Furthermore, Ac-PUDs can be prone to hydrolysis of the acrylate groups, resulting in the liberation of acrylic acid causing potential pH instability issues, again undesirable for inkjet printing.

Hydroxy-Functional Polyurethane Dispersions (OH-PUDs) and Inkjet

Inks comprising hydroxy-functional PUDs have been referred to e.g., in US2018/0105710 (Sensient Imaging), and although these produce inks with enhanced resolubility, the prints have deficient water (wet rub) resistance. This has been overcome by using crosslinkers, such as polycarbodiimides, which react with the carboxylic acid groups pendant on the PUD polymer. However, if inks based on such compositions were allowed to dry, they could form a crosslinked, insoluble matrix which could pose the risk of blocking the printhead nozzles.

Hydroxy-functional PUDs, which are relatively low molecular weight PUDs (i.e., typically, less than 15,000 number average molecular weight), are typically produced by using a suitable end-capping reagent such as ethanolamine or diethanolamine to attach the required hydroxyl groups to the polymer chain ends by the formation of a urea link between the amine of the end-capping reagent and the terminal isocyanate groups on the PUD prepolymer. As mentioned previously, such OH-PUDs can produce inks with excellent resolubility but as a consequence of their hydroxyl functionality and low molecular weight, produce prints of poor water (wet rub resistance) unless an additional crosslinker, such as polycarbodiimide, or polyisocyanate is used. As discussed previously, although such an approach has been referred to (e.g., in US2018/0105710), it runs the risk of producing crosslinked ink on press, which can be a significant disadvantage for inkjet printing.

U.S. Pat. No. 8,931,889B2 (Dupont Electronics) refers to the synthesis of OH-PUDs which comprise polyether diols as part of their chemical structure and their use in aqueous inkjet ink compositions. The OH-PUDs are described as providing improved stability and long nozzle life.

CN111138626 (Trendvision Technology) refers to the synthesis of PUDs for the aqueous inkjet printing of textiles. End-capping reagents such as N-methylethanolamine can be used in the PUD synthesis to prepare hydroxy-terminated PUDs. The use of such end-capping agents in the preparation of OH-PUDs is well known and practiced widely in the art, for example U.S. Pat. No. 7,875,355B2 (Sherwin Williams) refers to how OH-PUDs for the automotive industry can be prepared by using diaminopropanol as an end-capping reagent.

US20180105710 refers to how aqueous inkjet inks comprising OH-PUDs can be crosslinked through the use of crosslinkers such as carbodiimides, oxazolines, amino resins (such as melamine formaldehydes), blocked isocyanates and zirconium complexes. US20180105710 refers to OH-PUDs that can reduce printhead clogging, no doubt due to the improved resolubility of the inks conferred by the use of OH-PUDs. Undoubtedly, the use of the crosslinker, a carbodiimide being used in the examples of US20180105710, improves the print resistance which would otherwise be poor, as a result of the use of the OH-PUD, but with the attendant problems already discussed.

The current invention overcomes a number of issues associated with commercially available materials and by what has been referred to in the art, especially for inkjet printing. That is, the present invention provides an ink having excellent resolubility while limiting the risks associated with dried ink causing blockages in a printhead or ink supply system and at the same time being able to produce prints with good water resistance. Furthermore, the present invention typically achieves this advantageous combination of properties without recourse to the use of high concentrations (i.e., >35% (w/w)) of co-solvents such as glycerol or propylene glycol.

No record has been found referring to the use of the inventive self-curing PUDs, prepared in the manner described, in printing inks particularly for inkjet printing. The advantages brought by the invention are briefly mentioned above and will be described in more detail below but the exceptional resolubility of inks comprising this new class of PUDs allows resoluble inks to be prepared with low concentrations of solvents such as propylene glycol. The inventor has shown that resoluble inks can be produced preferably with contents of such high boiling point solvents of 25% (w/w), or less, 20% (w/w) or less, 15% (w/w) or less, 10% (w/w) or less. This is an important aspect as it is common for inkjet ink compositions to comprise higher concentrations of solvents such as propylene glycol, glycerol and other high boiling point water-soluble solvents to confer both the required viscosity and also resolubility in an ink.

Citation or identification of any document in this application is not an admission that such represents prior art to the present invention.

SUMMARY OF THE INVENTION

The present invention provides an aqueous printing ink composition comprising a polyurethane dispersion, wherein the polyurethane of the polyurethane dispersion comprises the properties of (a) ketone or aldehyde groups present at one or more polymer chain ends; (b) a number average molecular weight of ≤50,000, more preferably ≤25,000 and; (c) the content of ketone and aldehyde groups is in the range 0.02 to 4.0 mmol $g^{-1}$, based on the dry polymer weight.

Unless stated otherwise, reference to the content of ketone and aldehyde groups is to the content of chain-end ketone and aldehyde groups.

In a particularly preferred aspect of the invention, the groups present at one or more polymer chain ends are ketone groups. Accordingly, the present invention provides an aqueous printing ink composition comprising a polyurethane dispersion, wherein the polyurethane of the polyurethane dispersion comprises the properties of (a) ketone groups present at one or more polymer chain ends; (b) a number average molecular weight of ≤50,000, more preferably ≤25,000 and; (c) the content of ketone groups is in the range 0.02 to 4.0 mmol $g^{-1}$, based on the dry polymer weight.

As will be understood, a group present at the polymer chain end is referred to as an "end-group", "chain-end group" or "terminal group". This is different to a group being present on the polymer chain or as part of the polymer molecular structure, i.e., on the polymer backbone.

Preferably, the polyurethane is predominantly linear in structure, i.e., ≤5% of the polyurethane polymer chain contains a branched structure (based on the dry polymer weight). More preferably, the polyurethane is linear in structure.

As will be understood, the presence of one or more ketone or aldehyde groups at one or more polyurethane chain ends results in the polyurethane being end-capped with said ketone or aldehyde groups. It is preferred that the polyurethane used in the present invention comprises ketone or aldehyde groups at one or more polymer chain ends and nowhere else on the polymer chain. Preferably, the polyurethane is linear and comprises no more than two ketone or aldehyde groups per average polymer chain, which are present at the polymer chain end(s).

The end-capping approach to preparing self-curing PUDs, and the use of such SC-PUDs in the ink compositions described herein is a key feature of the present invention. Not only does this produce PUDs of low molecular weight (i.e., PUDs having a number average molecular weight of ≤50,000), which is beneficial to ink resolubility, it also produces PUDs with preferentially no more than two ketone (or aldehyde) groups per average polymer molecule. Consequently, when combined with difunctional co-reagents, such as adipic dihydrazide, curing in the ink can only result in a chain-extension to produce a higher molecular weight linear polymer, without forming an intractable and insoluble crosslinked matrix. It is this linear chain-extension without forming a crosslinked matrix that distinguishes the SC-PUDs of the present invention from self-crosslinking PUDs described in the art. In particular, self-crosslinking PUDs typically comprise more than two ketone groups on the polymer chain and therefore form crosslinks when combined with di-functional co-reagents such as adipic dihydrazide.

The inventor has shown that inks comprising the new class of SC-PUDS according to the invention enable the preparation of resoluble inks where the total concentration of co-solvents, such as propylene glycol, is ≤35% (w/w), preferably ≤30% (w/w) of the total ink composition. In particular, the inventor has shown that inks comprising the new class of SC-PUDS according to the invention enable the preparation of resoluble inks where the total concentration of co-solvents, such as propylene glycol, is less than 30% (w/w) of the total ink composition. In a further preferred aspect of the invention, solvents having boiling points greater than 200° C., such as glycerol, should be limited to less than 5% (w/w) of the ink composition. As will be understood by the skilled person, it is common practice to use concentrations of greater than 30% of such co-solvents in an aqueous inkjet composition to provide the necessary resolubility. However, such high concentrations of co-solvents have a deleterious impact on the drying speed, especially on impervious substrates.

DETAILED DESCRIPTION

The current invention addresses the issues of the prior art by producing inks possessing excellent resolubility along with good water (wet rub) resistance. This highly desirable balance of properties is achieved through the use of a new class of self-curable PUDs ('SC-PVDs'), where the SC-PUD has a number average molecular weight of less than or equal to 50,000, preferably less than or equal to 25,000, more preferably less than or equal to 15,000 and most preferably less than or equal to 10,000 and where the SC-PUD polymer chain is end-capped with ketone or aldehyde groups, preferably with ketone groups. By end-capping with ketone (or aldehyde) groups, the SC-PUD can be no more than difunctional (where it is linear as is preferred) with respect to the reactive ketone functionality and when this reacts with a difunctional curing co-reagent, such as adipic dihydrazide (ADH), it can only produce a linear polymer. In other words, the SC-PUD according to present invention does not form a crosslinked matrix in the presence of difunctional curing co-reagent such as adipic dihydrazide (ADH). As the reaction between the SC-PUD of the invention and difunctional curing co-reagent such as adipic dihydrazide (ADH) is retarded under alkaline conditions, the likelihood of producing high molecular weight products in a printhead is mitigated due to the neutralizing agents that are preferably used in the preparation of the SC-PUD and ink.

Diagram 1: Chain Extension Reaction of the SC-PUD

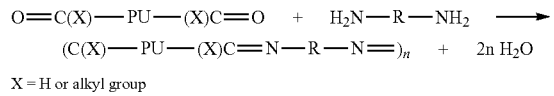

X = H or alkyl group

The reaction between a SC-PUD bearing two terminal ketone or aldehyde groups and a difunctional amine or dihydrazide is shown in Diagram 1. It can be seen that the reaction does not produce any crosslinks but results in a chain extension reaction between the two difunctional reagents. Essentially, this can be regarded as an A2B2 style step-growth polymerization reaction. In the diagram the reaction is shown to go through to an imine reaction product.

There is no particular restriction on how the SC-PUD is prepared and it may be either anionically or non-ionically stabilized (or both), although anionically stabilized SC-PUDs are preferred. The invention encompasses aromatic and aliphatic SC-PUDs and further encompasses SC-PUDs produced from polyether diols, polyester diols, polyacrylic diols, polycarbonate diols and any aliphatic or aromatic diol or any blend or hybrid thereof.

When the SC-PUD is prepared, an end-capping reagent comprising a ketone or aldehyde group is used to attach the reactive curable functionality to the chain ends of the polymer. The end-capping reagent preferentially comprises a primary or secondary amine which reacts with isocyanate groups on the polyurethane precursor to form a urea linkage and hence forming the desired SC-PUD. The polyurethane precursor may be prepared from any blend of diisocyanates and diols, where the diols can include, but are not limited to polyester diols, polycarbonate diols, polyacrylic diols and polyether diols. Preferably, the diols used to prepare the polyurethane precursor do not comprise any ketone or aldehyde groups in their molecular structure. Diisocyanates used in the preparation of the SC-PUDs may be aliphatic or aromatic types including, but not limited to isophorone diisocyanate, hexamethylene-1,6-diisocyanate, methylene diphenyl diisocyanate, hydrogenated methylene diphenyl diisocyanate and toluene diisocyanate. In the preparation of the polyurethane precursor, an excess of diisocyanate is used compared with the diol to leave the isocyanate functional prepolymer ready for end-capping with the carbonyl-functional reagent mentioned previously (i.e. the end-capping reagent comprising an aldehyde or a ketone group). An example of such an end-capping reagent includes:

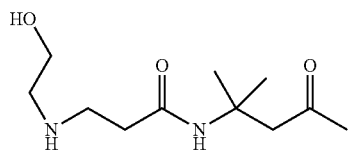 [SMILES: CC(=O)CC(C)(C)NC(=O)CCNCCO]

This specific end-capping reagent would introduce both a ketone and hydroxyl group to the termini of the SC-PUD polymer.

Although the invention is preferably directed towards the preparation of linear SC-PUDs, it also encompasses the possibility of branched SC-PUDs with the proviso that where the SC-PUD is branched there are at most two ketone or aldehyde groups at the polymer chain ends. Thus, as will be understood, where the SC-PUD is branched it is at most difunctional with respect to the reactive ketone or aldehyde functionality and does not comprise any aldehyde or ketone groups on the branches. The approaches for preparing such branched polyurethanes are well known and can be achieved, for example, through the use of trifunctional (e.g. biuret HMDI trimers) isocyanates, trifunctional or higher functional polyols or trifunctional or higher functional primary and secondary amines. It should also be understood that the SC-PUDs may use difunctional amines in their synthesis to introduce urea linkages into the polyurethane backbone, which may further help the print resistance properties.

Where the SC-PUD is anionically stabilized, it comprises acid groups as part of its polymeric structure (i.e., on the polymer backbone) which after neutralization with a suitable inorganic or organic base confer the anionic stabilization mechanism enabling its dispersion. Typical reagents used to introduce carboxylic acid groups into the SC-PUD structure during its synthesis include dimethylpropiionc acid (DMPA). It should be understood that other diol reagents comprising one or more carboxylic acid groups may be used in the preparation of the SC-PUD. It is also possible that other acid-bearing reagents may be used in the preparation of the SC-PUD. Where DMPA, or other acid-containing species, is incorporated into the SC-PUD backbone then it may be neutralized with any organic or inorganic base to enable the anionic stabilizing mechanism. In the case of non-ionically stabilized SC-PUDs, a hydrophilic segment is incorporated as part of the polyurethane dispersion (such as a poly(ethylene oxide)) to enable its dispersion.

Where the SC-PUDs are anionically stabilized, there is no restriction on the acid value of the SC-PUD although it is preferred that the acid value, based on the dry polymer weight, is between 0 and 100 mgKOH/g. More preferably, the acid value, based on the dry polymer weight, is at least 10, and more preferably at least 20 mgKOH/g. Accordingly, it is preferred that the acid value, based on the dry polymer weight is between 10 and 100 mgKOH/g, more preferably between 20 and 100 mgKOH/g. To disperse anionic SC-PUDs any suitable base may be used including organic and inorganic types to neutralize the acid groups of the SC-PUD, enabling it to be dispersed in water. Non-limiting examples of bases used to neutralize the carboxylic acid (or other acids) of the SC-PUD include, but are not limited to triethylamine, N,N-dimethylethanolamine, any other tertiary amine, potassium hydroxide, sodium hydroxide. Where the neutralizing agent is a tertiary amine, it preferably has a boiling point greater than 125° C. Preferably, the neutralizing agent is N,N-dimethylethanolamine.

Dispersion of SC-PUDs may also be promoted by the use of anionic and non-ionic surfactants.

There is no restriction on the particle size of the SC-PUD used in the preparation of the inks of the invention. However, it is preferred that the average particle size should be less than 250 nm, and more preferably less than 100 nm.

There is no particular restriction on the total solid content contributed by the SC-PUD to the final aqueous (inkjet) printing ink composition. However, it is preferred that the total solid content contributed to the final ink formulation should be in the range 2.5% (w/w) to 40% (w/w), and more preferably in the range 5.0% (w/w) to 20.0% (w/w) of the final ink composition for inkjet compositions, based on the dry polymer weight.

Another aspect of the invention, which helps to further promote the resolubility of inks comprising the new class of SC-PUDs, is that they may also be end-capped with hydroxy groups, i.e., the polyurethane may be end-capped with an end-capping reagent comprising both hydroxy and ketone or aldehyde functionality such as the exemplary end-capping reagent shown above. Accordingly, the SC-PUDs of the present invention optionally may also comprise chain-end (terminal) hydroxy groups. In this case, the hydroxy value of the SC-PUD, based on the dry polymer weight, should preferably be less than 100, and more preferably less than 50 mgKOH g$^{-1}$.

End-capping reagents comprising ketone (or aldehyde) groups and optionally additional hydroxyl groups are typically used to control the molecular weight of the SC-PUDs. The inventive SC-PUDs have number average molecular weights of ≤50,000, more preferably ≤25,000, more preferably ≤15,000, and most preferably ≤10,000. The relatively low molecular weights of this new class of PUDs also contribute to the resolubility observed in printing inks.

The SC-PUD of the invention preferentially uses a difunctional amine or dihydrazide, such as adipic dihydrazide to affect the curing by reaction with the terminal carbonyl groups (i.e., ketone or aldehyde groups) on the polyurethane. However, it should be understood that the invention also incorporates polyfunctional amines, that is those bearing three or more primary amine groups.

The carbonyl end groups (i.e., ketone or aldehyde end groups) of the SC-PUDs used in the inks of the invention may also be cured via reaction with other co-reagents such as multivalent metal complexes, as disclosed by U.S. Pat. No. 7,947,760 (BASF Corp.). Indeed, it is possible to cure inks comprising SC-PUDs by including in the ink compounds such as ammonium zirconium carbonate as curing reagents rather than the preferred diamine or dihydrazide. The ink compositions according to the invention may optionally further comprise one or more acids selected from the group consisting of tartaric acid, gluconic acid, citric acid, maleic acid, succinic acid and salts thereof. In some aspects, the ink compositions may comprise ammonium zirconium carbonate as curing reagent and one or more acids selected from the group consisting of tartaric acid, gluconic acid, citric acid, maleic acid, succinic acid and salts thereof.

Preferably, the SC-PUD is combined with a difunctional amine co-reagent, such as adipic dihydrazide, to enable the self-curing inks of the invention.

Preferably, the molar ratio of SC-PUD to the co-reagent that enables self-curing is between 0.1:10 and 10:0.1 based on the relevant molar concentrations of the SC-PUD and co-reagent, preferably between 0.2:5 and 5:0.2, more preferably between 0.5:2 and 2:0.5. In a more preferred aspect, the curing co-reagent is adipic dihydrazide (ADH) and the molar ratio of SC-PUD to ADH is between 0.1:10 and 10:0.1 based on the relevant molar concentrations of the SC-PUD and co-reagent, preferably between 0.2:5 and 5:0.2, more preferably between 0.5:2 and 2:0.5.

The aqueous inks of the present invention are predominantly water-based. More specifically, the inks of the present invention comprise between 5 and 90 wt % water, such as between 5 and 80 wt % or 10 and 80 wt % water. Preferably, the inks of the invention comprise between 10 and 80 wt % water, more preferably between 15 and 80 wt % water.

The printing inks of the invention may optionally comprise any water-soluble organic co-solvent. Although volatile solvents such as ethanol, propanol and isopropanol may be used, where the inks are intended for inkjet printing it is preferred that those which are not highly flammable or volatile should be used, typically a polyol, an alkylene glycol, an alkylene glycol ether or ether acetate type, such as the following non-limiting examples: 3-methoxy-3-methyl-1-butanol, 4-hydroxy-4-methyl-2-pentanone, diethyelene glycol, diethylene glycol butyl ether, diethylene glycol ethyl ether, diethylene glycol methyl ether, diethylene glycol monoethyl ether acetate, diethylene glycol monopropyl ether, dipropylene glycol, dipropylene glycol ethyl ether, dipropylene glycol methyl ether, ethylene glycol butyl ether, ethylene glycol ethyl ether, ethylene glycol isopropyl ether, ethylene glycol methyl ether, ethylene glycol propyl ether, glycerine carbonate, N-methyl 2-pyrrolidone, glycerol, propylene glycol, propylene glycol ethyl ether, propylene glycol ethyl ether acetate, propylene glycol methyl ether, propylene glycol n-propyl ether, triethylene glycol, triethylene glycol butyl ether, triethylene glycol methyl ether, tripropylene glycol, tripropylene glycol methyl ether, N-methyl pyrollidone, urea, and the like.

Preferably, the inks of the present invention comprise propylene glycol and/or 3-methoxy-3-methyl-1-butanol (MMB). Where the inks of the invention comprise propylene glycol and 3-methoxy-3-methyl-1-butanol they are preferably in a ratio of 3:1 to 1:3 (propylene glycol to 3-methoxy-3-methyl-1-butanol).

It is preferred that where organic co-solvents are used they should form ≤35% (w/w) and more preferably ≤30.0% (w/w) of the ink composition. For instance, it is preferred that where organic co-solvents are used they should form less than 35% (w/w) and more preferably less than 30.0% (w/w) of the ink composition. Indeed, the total concentration of water-soluble organic solvents should preferably be 35% (w/w) or less, more preferably 30.0% (w/w) or less, and even more preferably 25.0% (w/w) or less of the ink composition.

The present inventor has shown that it is possible to prepare resoluble inks with water-soluble organic co-solvent concentrations as low as 10% (w/w) of the ink composition by using the SC-PUDs according to the present invention. Thus, in a further preferred aspect, the inks according to the invention comprise ≤10% (w/w) of water-soluble, co-solvents.

A further, optional, feature of the invention is that where any water-soluble organic co-solvent is used, it should preferably have a boiling point of less than 250° C., and more preferably less than 200° C. Indeed, by using the SC-PUDs according to the present invention, highly resoluble inks can be prepared without recourse to the use of greater than 35.0% (w/w) of co-solvents having boiling points in excess of 200° C. and especially in excess of 250° C., such as glycerol and diethylene glycol, amongst others. The use of such involatile solvents at concentrations often in excess of 35% (w/w) of the ink formulation is a commonly used approach for inkjet printing inks, not only to raise the viscosity of the ink but also to ensure that the ink has acceptable resolubility. However, the use of such high boiling point solvents has the associated disadvantage of causing slow drying times of the inks, which is undesirable for high throughput printing. Preferably, the inks according to the invention do not comprise solvents with a boiling point of greater than 250° C., more preferably the inks according to the invention do not comprise solvents with a boiling point of greater than 200° C. Furthermore, if used, it is preferred that the concentration of solvents having boiling points of greater than 250° C. should be less than 10.0% (w/w) and more preferably less than 5.0% (w/w) of the ink composition.

One of the advantages of the present invention is that excellent resolubility is surprisingly achieved with concentrations of water-soluble co-solvents, such as propylene glycol, of 35% (w/w) or less, more specifically 30% (w/w) or less. Indeed, the inventor has shown that resoluble inks can be produced with co-solvent concentrations of 25% (w/w) or less and as low as 10% (w/w). Having inks that are readily resoluble without recourse to the use of high concentrations of high boiling point solvents such as propylene glycol and glycerol (also known as a humectants) is advantageous as it results in inks for inkjet printing with a faster drying response. This helps the inkjet inks of the invention to serve the higher throughput industrial inkjet printing markets such as packaging, corrugated, label printing, textiles, etc. Furthermore, the faster drying response achievable with the inkjet inks of the invention will also allow a reduction in the energy input required to dry them. This is beneficial for the aforementioned printing markets but will also prove beneficial in the multipass inkjet graphics printing market. Currently, the multipass inkjet graphics market is largely served by UV-curable and solvent-based inkjet compositions. There are growing concerns around the health and safety of UV-curable inkjet compositions due to the continuing toxicological assessment of the monomers and photoinitiators used in their preparation. Solvent-based inkjet printing ink compositions typically comprise more than 70% of blends of organic solvents as part of their composition. The inks of the current invention comprise water as the major part of the solvent content (i.e., typically more than 70% of the solvent blend used in the present invention is water) and the SC-PUD, being polymeric in nature, poses much less of a health risk than the monomers and photoinitiators used in UV-curable inkjet printing ink compositions. Furthermore, the use of solvents derived from renewable sources, such as propylene glycol may also be used in the inventive compositions but they should preferably be used in ≤30% (w/w) of the composition.

A further optional feature of the invention is that the inks comprise concentrations of solvents with boiling points greater than 150° C. of 30% (w/w) or less, preferably 25% (w/w) or less. By minimizing the concentration of such solvents, and especially those having heats of vaporization of greater than 500 J $g^{-1}$, faster drying inks is enabled, which are of great benefit for high-speed inkjet printing. Yet a further benefit of lower co-solvent concentrations is a reduction in the amount of energy required to dry the inks. The inventor has shown that stable inks may be prepared comprising 3-methoxy-3-methyl-1-butanol ('MMB'), a water-soluble co-solvent with a boiling point of 174° C. and a heat of vaporization of about 385 J $g^{-1}$, compared with 187° C. and about 880 J $g^{-1}$ for propylene glycol. The use of such solvents with lower heats of vaporization will produce faster drying inks. Hence, the inks according to the present invention preferably comprise ≤30% (w/w) of any solvent having a heat of vaporization of ≥500 J $g^{-1}$. For instance, the inks according to the present invention preferably comprise less than 30% (w/w) of solvents having heats of vaporization greater than 500 J/g.

Thus, a further preferred aspect of the invention is that the concentration of organic water-soluble co-solvents, and especially those having heats of vaporization of 500 J/g, or greater, and boiling points greater than 150° C., should preferably be less than 30%, and more preferably 25% (w/w) or less of the total ink composition. Where such co-solvents are used, then any combination of solvents having boiling points of greater than 200° C., should preferably be less than 10% (w/w) of the ink composition.

Yet a further benefit of the use of the new class of self-curing PUDs according to the invention in printing ink compositions is that they can produce resoluble/redispersible inks with pigment dispersions comprising anionic dispersants (e.g., anionic acrylic copolymer dispersants) and also pigment dispersions comprising non-ionic dispersants. The latter result is especially notable as such non-ionic dispersants tend to be highly water-sensitive and the capacity of this new class of PUDs to produce inks enabling prints having good water (wet rub) resistance enhances the utility of this new technology.

A further benefit of the invention is that the excellent water (wet rub) resistance of the prints can be achieved without using excessively high temperatures. Indeed, after initial drying, the prints can develop their resistance properties with time, typically achieving a high level of print resistance within 24 hours after printing.

After printing and drying the inks of the invention, they can cure at room temperature or at elevated temperatures, for example 50° C., or greater. The inventor has found that at ambient conditions (i.e. 22 to 25° C.) the cure of the inks can develop a day or more after printing. The cure of the inks can be accelerated by heating the prints at temperatures of 50° C., or greater.

The benefits of an ink having good resolubility allied with the capability of producing prints with excellent water resistance enable inks prepared according to the invention to be used in a range of applications. In particular, the inks of the invention are suitable for a wide range of applications, including the printing of packaging, including flexible packaging (surface print and reverse print) and flexible film packaging, rigid packaging (including printing of coated metal substrates, i.e., metal decoration), carton board and paper packaging, corrugated packaging, the printing of decor laminates, textiles printing, graphics printing, etc. When the inks of the invention are used to print packaging materials, this may also include food packaging. For inkjet printing, the invention is suitable for both single pass and multipass printing, terms well recognized in the industry.

The excellent water resistance of prints achievable with the technology of the present application makes it suitable for surface print applications without the need of an overprint varnish. Furthermore, since resoluble/redispersible inks can be produced with concentrations of co-solvents, such as propylene glycol, of 25% (w/w) or less, high speed printing of these inks can be achieved, whether that be multipass or single pass inkjet printing. It is the use of the SC-PUDs that provides the excellent resolubility of the inks of the invention.

Although directed primarily towards inkjet printing inks, the invention also encompasses aqueous inks that can be printed via flexographic and gravure printing methods. Indeed, the excellent resolubility of the SC-PUD technology according to the invention will be highly beneficial in these printing markets allowing for rapid clean down between jobs and reducing the risk associated with the filling-in of anilox cylinders. A potential issue with the self-crosslinking (acrylic) technologies which are currently used is that inks can dry into the anilox cylinders causing consequent issues with print quality.

For inkjet printing, the inks of the invention may be printed onto any substrate which has previously been pre-coated with a suitable primer composition to enhance the print quality. Such primers typically comprise a multivalent metal salt which helps to 'fix' the ink, reducing print quality issues such as drop spread and intercolor bleed. It should be understood that although primers do not form an integral part of the invention, any suitable primer enhancing the print quality achievable with the inventive inks may be used. Alternatively, the inks of the invention may be printed onto any substrate which has not previously been pre-coated with a primer.

The invention discloses the finding that aqueous printing inks having excellent resolubility/redispersibility but with the capacity to cure after printing to produce water resistant prints can be prepared through the use of a new class of self-curing polyurethane dispersion ('SC-PUD'). The inks of the invention are especially suited to inkjet printing where the excellent resolubility conferred by the technology reduces the risks associated with an ink becoming irreversibly dried into the nozzles of the printhead. The SC-PUDs used in the ink compositions of the invention comprise ketone, or aldehyde, groups located at the polymer chain ends. When these SC-PUDs are cured with a difunctional co-reagent such as a diamine or dihydrazide (adipic dihydrazide for instance) they can only cure to produce chain extended, higher molecular weight linear polymers. This unique feature distinguishes the inks of the invention from those where crosslinking chemistries are used. The crosslinking chemistries currently used in the art include self-crosslinking styrene-acrylic dispersions, self-crosslinking polyurethane dispersions. If allowed to dry and fully cure these chemistries would produce potentially insoluble crosslinked polymer matrixes, which could pose issues for printing inks, and especially for inkjet.

The use of the SC-PUD according to the invention confers the resolubility/redispersibility of the inks, which is an especially useful feature for aqueous inkjet printing inks. Resolubility/redispersibility, in the context of this invention and inkjet printing more broadly, can be described as the ability of an ink drying at temperatures up to 40° C., and even 50° C., for periods up to one hour (or more), e.g., 30 minutes, to re-dissolve or redisperse into itself or a suitable 'flushing' solution. Inks comprising conventional PUDs, conventional self-crosslinking PUDs and styrene-acrylics typically have poor resolubility.

Inks having excellent resolubility can be prepared by using hydroxy-functional PUDs ('OH-PUDs'), but without any additional crosslinker these inks produce prints with poor water (wet rub resistance). Indeed, inks comprising the SC-PUDs of the present invention have been shown to have resolubility comparable to that achievable with inks comprising OH-PUDs. Furthermore, when crosslinkers are used to enhance the print resistance of inks comprising OH-PUDs, the ink resolubility is significantly compromised.

Preferably, the ink compositions according to the invention do not comprise any carbodiimides (e.g., polycarbodiimides), oxazolines (e.g., poly oxazolines), azriridines (e.g., poly azriridines), epoxies, amino resins (such as melamine-formaldehhydes), isocyanates (e.g., blocked isocyanates) and/or silanes. More preferably, the ink compositions according to the invention do not comprise any polycarbodiimides.

For inkjet printing, the invention is exceptionally advantageous as the good resolubility will help to prevent the irreversible drying of inks in a printhead. If such irreversible drying of an ink in a printhead occurred it could lead to blocked nozzles and a consequent loss in print quality performance or, even worse, the loss of the printhead itself. So it can be seen that an ideal solution for an inkjet printing ink would be one that has good resolubility (with advantages of open time) yet at the same time being able to cure after printing and drying to produce water resistant prints. The invention achieves this without the use of excessive concentrations of high boiling point co-solvents such as glycerol and propylene glycol. Indeed, the inventive inks maintain good resolubility/redispersibility with propylene glycol concentrations as low as 5.0% (w/w) of the ink composition.

The issue with using conventional PUDs by themselves in the preparation of aqueous inkjet ink compositions is that when they are dried at 40° C. for between 15 and 60 minutes they become largely insoluble in either the ink itself or a flushing solution. This issue is resolved by the current invention. Contrariwise, OH-PUDs, especially those having hydroxyl values of greater than 50 mgKOH/g, can produce inks having excellent resolubility/redispersibility, but which generally produce dried prints with poor water resistance. Again, this issue is resolved by the invention. Even if an ink dries on a faceplate of a printhead, and not within the body of the printhead and ink supply system this could be restricting. Printhead faceplates are often coated with what is termed a non-wetting coating ('NWC'). NWCs can be delicate structures comprising thin ceramic layers and to remove an insoluble residue from such a NWC could damage it, which would have consequences for print quality.

Where the compositions of the invention are intended for inkjet printing then they should preferably have viscosities, at 32° C., of less than 10.0 mPa.s. as measured using a Brookfield DV-II+ Pro Viscometer equipped with Spindle no. 18, at 100 rpm.

The pH of the inks should preferably be in the range 5.0 to 10.0 and more preferably in the range 6.0 to 9.5.

The SC-PUDs according to the present invention comprise pendant ketone or aldehyde groups attached to at least one end (i.e. terminus) of the polyurethane. Furthermore, the SC-PUD, based on the dry polymer weight, contains at least 0.02 to 4.0 mmol of chain-end ketone and aldehyde groups per gram of SC-PUD (mmol(C=O) $g^{-1}$). The amount of chain-end ketone and aldehyde groups in the SC-PUD (on the dry polymer weight basis) should preferably be in the range of 0.05 to 2.0 mmol $g^{-1}$.

Self-crosslinking PUDs (and styrene-acrylics) are known, and the keto-hydrazide crosslinking chemistry is well known and utilized in commercial products. The ketone, or aldehyde, groups in the polymer backbone which participate in this crosslinking reaction may be introduced into the PUD backbone by using a diol in the PUD manufacture that comprises a ketone group. This may be achieved by reacting a ketone-functional acid, such as levulinic acid, with a diepoxide to produce the desired ketone diol. Other approaches include the reaction of diacetone acrylamide with an alkanolamine such as diethanolamine. These self-crosslinking PUDs are different to the self-curing PUDs according to the present invention in that a proportion of the polymer molecules will contain greater than two ketone or aldehyde groups as part of their molecular structure. When inks comprising these self-crosslinking PUDs are dried in the presence of a crosslinking co-reagent, such as adipic dihydrazide, they can react to form a crosslinked structure. Such a crosslinked polymer network in a drying or dry ink would have a detrimental impact on the resolubility/redispersibility of the ink and could potentially cause the irreversible blocking of the nozzles in an inkjet printhead.

Conventional (non-crosslinking) PUDs, such as Neorez R605, also have poor resolubility in terms of inkjet printing ink applications. This is probably due to the higher molecular weight (i.e., number average molecular weight in excess of 50,000) of these polymers compared with the SC-PUDs used in the ink compositions of the invention and also of hydroxy-functional PUDs ('OH-PUDs') described in the art. The inventor has confirmed that inks comprising OH-PUDs such as those described in the art do indeed have excellent resolubility. However, probably due to a combination of their hydroxyl content and low molecular weight (typically less than 15,000 number average molecular weight) the water resistance of prints of inks comprising such OH-PUDs is deficient. Interestingly, the inventor has found that with the new class of SC-PUDs according to the present invention, although the presence of hydroxyl groups at the polymer chain end in addition to the ketone or aldehyde groups can promote resolubility of an ink, it is not absolutely essential to conferring resolubility. Perhaps more importantly is the molecular weight of the PUD. In some cases, the SC-PUD may have a number average molecular weight of less than 10,000 and even less than 5,000. Based on the composition of the SC-PUD and knowing either the ketone or aldehyde content or the hydroxyl value of the PUD enables a calculation of the number average molecular weight (essentially a chain end analysis). The weight average molecular weights have also been measured via gel permeation chromatography (GPC). It should be noted that in the determination of the molecular weight of the SC-PUD by GPC that this was done in the absence of any co-reagent of the self-curing chemistry, typically ADH.

The SC-PUDs used in the inks of the invention are preferably combined with a diamine or dihydrazide co-reagent, primary amines and hydrazides being preferred, to affect the curing of the SC-PUD once the ink is printed and dried. Combining the preferred difunctional SC-PUD, i.e., a linear polyurethane having a ketone group at both polymer chain ends, (or in some cases monofunctional SC-PUD) with the difunctional amine or hydrazide co-reagent results in a curing process that proceeds without crosslinking, to produce a chain extended, linear, adduct of the SC-PUD and difunctional co-reagent. It is this differentiating feature of the SC-PUD that makes them especially suited for inkjet printing applications, but also for aqueous inks applied by flexographic and gravure printing. The curing process can progress at room temperature for up to 24 hours or more or can be accelerated by exposing the print to elevated temperatures, such as 50° C., or higher. Typical water-soluble multifunctional reagents which can cure the ketone (or aldehyde) groups of the SC-PUD include but are not limited to adipic dihydrazide ('ADH'), pimelic acid dihydrazide any other dihydrazide derived from a difunctional acid, aliphatic di-, tri and higher functional amines. The latter may include polyethylene oxide comprising polyfunctional amines such as those supplied by Huntsman under the brand name 'Jeffamine'. It is also possible to cure ketone-containing PUDs using a polymer dispersion which comprises as part of its structure either primary or secondary amines. The ketone groups of the SC-PUDs may also be cured by using metal complexes, such as zirconium ammonium carbonate. However, difunctional amine and hydrazide co-reagents are the preferred choice for the reasons already outlined.

Metal complexes, such as ammonium zirconium carbonate ('AZC'), may be used to prepare self-crosslinking PUDs. Such metal complexes, present in the aqueous phase of the polymer dispersion can react after the ink has been printed and dried, with carboxylic acid and carbonyl groups present in the PUD backbone. This has already been achieved for acrylic dispersions, as revealed in U.S. Pat. No. 7,947,760. Long shelf-life of the compositions, which can be an issue when using AZC, was achieved by using a stabilizer such as ammonium tartrate. This approach has not yet been taken for PUD chemistry. In this invention, the inventor has shown that addition of AZC to an ink comprising a SC-PUD (not containing any ADH) produced an ink having a degree of resolubility and print resistance, but not of the same order as was achievable with an ink comprising the same SC-PUD using ADH as the curing co-reagent.

Although not an essential feature, inks prepared according to the invention may also include any further water-soluble, alkali-soluble or water-dispersible resin, other than the SC-PUD. As will be understood, alkali-soluble resins typically comprise acidic functionality as part of the monomer blend that are capable of being neutralized with a suitable base such that the resin can be dissolved in water to form an aqueous solution. Additional resins include, but are not limited to polyurethane dispersions, self-crosslinking polyurethane dispersions, alkali-soluble acrylics, acrylic dispersions, self-crosslinking acrylic dispersions, polyester dispersions, poly(vinyl acetate) and copolymers of vinyl acetate dispersions, poly(vinyl alcohols), poly(vinyl pyrrolidones). It should be understood that one skilled in the art could modify inks prepared according to the invention through the addition of additional resins, but such modifications would fall within the spirit of the invention.

In an alternative aspect of the invention, the inks do not include any further water-soluble, alkali-soluble or water-dispersible resin, other than the SC-PUD. It may be the case that the inks of the invention do not include additional polyurethane dispersions (i.e., other than the SC-PUD), self-crosslinking polyurethane dispersions, alkali-soluble acrylics, acrylic dispersions, self-crosslinking acrylic dispersions, polyester dispersions, poly(vinyl acetate) or copolymers of vinyl acetate dispersions, poly(vinyl alcohols), poly(vinyl pyrrolidones), preferably the inks do not include any self-crosslinking acrylic dispersions.

There is no restriction on the total amount of resin that can be used in inks prepared according to the invention but it may be in the range 2.5% (w/w) to 40.0% (w/w), more preferably in the range 5.0% (w/w) to 30.0% (w/w) and most preferably, especially for aqueous inkjet printing inks in the range 5.0% to 20.0% (w/w) of the total ink composition, based on the dry combined weight of the SC-PUD and any other resin.

Since the products of the current invention are primarily water-based in nature, it is also preferable to include a biocide or anti-mold agent. Suitable examples include products based on but not limited to the following biocide structural types: benz-isothiazolinone, bromo-nitro-propane-diol, isothiazolinone, ethylenedioxydimethanol, or iodo-propynyl butyl carbamate. Some commercially available grades include those marketed under the trade names Intercide (Akcros Chemicals) or Nipacide (Clariant). Other types of biocide that could be considered include sodium dehydroacetate (Geogard 111S from Lonza), sodium benzoate (Vancide 51 from R. T. VANDERBILT), sodium pyridinethiol-1-oxide (Sodium Omadine from Arch Chemicals), sodium salt of o-phenylphenol (Dowicide A from DOW Chemical) and ethyl p-hydroxybenzoate (Nipastat Sodium from Aako). These are preferably used at an amount of 0.01 to 1.00% by mass in the ink composition.

Defoamers can also optionally be included in the formulation; these prevent the formation of foam during manufacture of the ink and also while jetting. Defoamers are particularly important with recirculating printheads. Examples of suitable defoamers include, but are not limited to, TEGO FOAMEX N, FOAMEX 1488, 1495, 3062, 7447, 800, 8030, 805, 8050, 810, 815N, 822, 825, 830, 831, 835, 840, 842, 843, 845, 855, 860, and 883, TEGO FOAMEX K3, TEGO FOAMEX K7/K8 and TEGO TWIN 4000 available from Evonik. Available from BYK are BYK-066N, 088, 055, 057, 1790, 020, BYK-A 530, 067A, and BYK 354.

The additives DC62, DC65, DC 68, DC71 and DC74 are available from Dow Corning. Agitan 120, 150, 160, 271, 290, 298, 299, 350, 351, 731, 760, 761, and 777 are available from Munzing. Surfynol 104PA, AD01, DF-110, DF-58, DF-62, DF-66, DF-695, DF-70, and MD-20 are available from Air Products.

Surface control additives are often optionally used to control the surface tension of the ink, which is required to adjust the wetting on the face plate of the printhead, and also to give the desired drop spread on the substrate, or, in the case of multi pass inkjet printing, wet on dry drop spread. They can also be used to control the level of slip and scratch resistance. Examples of suitable surface control additives include but are not limited to TEGO FLOW 300, 370, and 425, TEGO GLIDE 100, 110, 130, 406, 410, 411, 415, 420, 432, 435, 440, 482, A115, and B1484, TEGO GLIDE ZG 400, TEGO RAD 2010, 2011, 2100, 2200N, 2250, 2300, 2500, 2600, 2650, and 2700, TEGO TWIN 4000 and 4100, TEGO WET 240, 250, 260, 265, 270, 280, 500, 505, and 510 and TEGO WET KL245, all available from Evonik. Available from BYK are BYK 333 and 337, BYK UV 3500, BYK 378, 347 and 361, BYK UV 3530 and 3570, CERAFLOUR 998 and 996, NANOBYK 3601, 3610, and 3650, and CERMAT 258. Available from Cytec are EBECRYL 350 and 1360, MODAFLOW 9200, and EBECRYL 341. From Sartomer the aliphatic silicone acrylate CN9800 may be used. Surfynol 104, 420, 440, 465, 485, 61, 82, and 2502 are available from Air Products. Multiwet BD, EF, SU, SO, and VE are available from Croda. Capstone FS-30, 31, 34, 35, 50, 51, 60, 61, 63, 64, 65, and 3100 are available from Du Pont.

Included in the ink formulation can optionally be a suitable de-aerator. These prevent the formation of air inclusions and pinholes in the cured ink film. These also reduce rectified diffusion, which can cause reliability issues in the printhead. Non-limiting examples include the following products available from Evonik: TEGO AIREX 900, 910, 916, 920, 931, 936, 940, 944, 945, 950, 962, 980, and 986.

The ink compositions of the present invention may optionally contain one or more colorants, including pigments and/or dyes. Examples of suitable organic or inorganic pigments include carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitroanilines, pyrazoles, diazopyranthrones, pyrazoles, dianisidines, pyranthrones, tetracholoroisoindolines, dioxazines, monoazoacrylides and anthrapyrimidines. The dyes include but are not limited to azo dyes, anthraquinone dyes, xanthene dyes, azine dyes, combinations thereof and the like.

Commercial organic pigments classified according to Color Index International may be used, including, but not limited to, those according to the following trade designations: blue pigments PB1, PB15, PB15:1, PB15:2, PB15:3, PB15:4, PB15:6, PB16, PB60; brown pigments PB5, PB23, and PB265; green pigments PG1, PG7, PG10 and PG36; yellow pigments PY3, PY14, PY16, PY17, PY24, PY65, PY73, PY74 PY83, PY95, PY97, PY108, PY109,PY110, PY113, PY128, PY129, PY138, PY139, PY150, PY151, PY154, PY156, PY175, PY180 and PY213; orange pigments PO5, PO15, PO16, PO31, PO34, PO36, PO43, PO48, PO51, PO60, PO61 and PO71; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; black pigments PBk1, PBk6, PBk7, PBk8, PBk9, PBk10, PBk11, PBk12, PBk13, PBk14, PBk17, PBk18, PBk19, PBk22, PBk23, PBk24, PBk25, PBk26, PBk27, PBk28, PBk29, PBk30, PBk31, PBk32, PBk33, PBk34, PBk35, NBk1, NBk2, NBk3, NBk4, NBk6; combinations thereof, and the like.

The pigments are milled to typically less than 1 micrometer after milling with a preferred particle size distribution of 10-500 nm, more preferably 10-350 nm to have better transparency and a wide color gamut.

In order to incorporate the above-described pigments to the inventive compositions, it is preferable that the pigments are manufactured and stably stored as a pigment concentrate in water. This is typically achieved by dispersing the pigment into a water-soluble or water-dispersible resin using a water-soluble and/or a water-dispersible surfactant which introduces hydrophilic functional groups into the surface of the pigment particles. Examples of these dispersing resins are numerous and could include polyvinyl alcohols, polyacrylic acid, acrylic acid-acrylonitrile copolymers, vinyl acetate-acrylate copolymers, acrylic acid-acrylate copolymers, styrene-acrylic acid copolymers, styrene-methacrylic acid copolymers, styrene-methacrylic acid-acrylate copolymers, styrene-alpha methyl styrene-acrylic acid copolymers, styrene-alpha methyl styrene-acrylic acid-acrylate copolymers, styrene-maleic acid copolymers, styrene-maleic anhydride copolymers, vinyl naphthalene-acrylic acid copolymers, vinyl naphthalene-maleic acid copolymers, vinyl acetate-maleate copolymers, vinyl acetate-crotonic acid copolymers, and vinyl acetate-acrylic acid copolymers, and the salts thereof. The copolymers can be used in any form of random copolymer, block copolymer, alternating copolymer and graft copolymer. Examples of such resins include Joncryl 67, 678, 8500, 586, 611, 680, 682, 683 and 69 available from BASF. These resins are commonly neutralized with ammonia to enable the preparation of polymer solutions. It is also possible to neutralize such resins with any other organic amine, or indeed an inorganic base.

The inks according to the present invention may optionally comprise a pigment dispersion, for example an aqueous dispersion comprising a pigment, one or more of the water-soluble and/or water-dispersible resins listed above. Optionally, the aqueous pigment dispersion may further comprise one or more water-soluble and/or water-dispersible surfactants.

Examples of surfactants used for the pigment dispersion include, but are not limited to, anionic surfactants such as alkane sulphonates, alpha-olefin sulphonates, alkyl benzene sulphonates, alkyl naphthalene sulphonates, acyl methyl taurinates, dialkyl sulfosuccinates, alkyl sulfates, sulfurized olefins, polyoxyethylene alkyl ether phosphates, polycarboxylic acids and mono glycerol phosphate, amphoteric surfactants such as alkylpyridinium salts and non-ionic surfactants such as polyoxyethylene alkyl ethers, polyoxyethylene alkyl phenyl ethers, polyoxyethylene alkyl esters, polyoxyethylene alkyl amides, glycerol alkyl esters and sorbitan alkyl esters. Examples include EFKA 1000, 4000, 5000 and 6000 series products from BASF, Tamol series products from Dow, and Solsperse 27,000, 40,000, 44,000, 46,000 and 47,000 from Lubrizol.

The inventor has used pigment dispersions comprising anionic and/or non-ionic dispersants to produce inkjet ink compositions having excellent resolubility and with the capacity to produce prints with excellent water (wet rub) resistance. Non-ionic dispersants (and surfactants) being innately water-sensitive can produce inks with poor water resistance, so the finding that inks containing an SC-PUD and a pigment dispersion prepared using a non-ionic dispersant can produce water resistant prints is a significant finding for inkjet applications. As such, an optional feature of the invention is for inks comprising pigment dispersions prepared using either anionic or non-ionic dispersants, or a combination of both. Where the inks comprise a pigment dispersion prepared using an anionic dispersant, the anionic dispersant is preferably an anionic acrylic copolymer dispersant.

Inkjet compositions prepared according to the invention are suitable for printing by either multipass or single-pass operations. The applications that are covered by the invention include, but are not limited to, the multipass printing of textiles, including cotton-rich fabrics, the single-pass printing of textiles, the multipass printing of packaging, including carton board, the single pass printing of packaging, including labels, corrugated, carton board and flexible packaging, the single pass and multipass printing of metal substrates including metal decoration of cans and decor printing. Inkjet compositions prepared according to the invention are also ideally suited to the multipass graphics printing market. For the graphics market inventive inkjet compositions may be printed onto any flexible or rigid substrate including, but not limited to; paper, vinyl, acrylic, polystyrene, polycarbonate, metals, etc. The inventor has shown that inkjet inks of the invention have excellent performance (i.e., excellent adhesion and water (wet rub) resistance) on vinyl, acrylic and polycarbonate substrates used in the graphics inkjet printing market, particularly vinyl, acrylic and polycarbonate substrates used in the multipass inkjet graphics market. Although directed towards inkjet compositions the invention also lends itself to aqueous flexographic and gravure inks.

In all cases the printing of inventive inkjet compositions may be preceded by the application of a print-receptive primer to the substrate to be printed. The substrates to be printed, especially packaging substrates including polyester films, polypropylene films, nylon films, cellulose acetate films, polyethylene films, aluminum foils, metal sheets and rolls and any coated derivative thereof may be further treated prior to printing via corona discharge or plasma treatments to enhance the adhesion and print receptivity. Likewise, the printed material may be subject to further operations to realize a final product, including but not limited to, over-lacquering, lamination, etc. For the packaging market, the printing inks of the invention lend themselves to the preparation of laminates where the laminates may be produced by adhesive or thermal lamination processes. Those skilled in the art will be aware of the various processes and detail of such processes that will enable the inks of the invention to perform properly in the aforementioned markets. Therefore, in a further optional embodiment of the invention, inkjet printing inks according to the invention are printed onto substrates which have been pre-coated with such primers.

Definitions

Boiling point: Unless stated otherwise, all boiling points are measured under standard atmospheric pressure of 101 kPa.

Heat of Vaporization: This is defined as the amount of energy (enthalpy) that must be added to a liquid substance to transform a quantity of that substance into a gas. For the purposes of the present disclosure, the enthalpy of vaporization is given at the normal boiling temperature of the substance in question, wherein the normal boiling point is the boiling point of a substance at one atmosphere pressure.

As used herein, room temperature is 25° C.

Unless stated otherwise, solubility is measured at 25° C.

Hydroxyl Value (OHV): This is defined as the number of milligrams of potassium hydroxide required to neutralize the acetic acid taken up on acetylation of one gram of a chemical substance that contains free hydroxyl groups. The hydroxyl value is suitably measured in accordance with the ISO 4629-1:2016(E).

Acid Value (AV): The mass of potassium hydroxide (KOH) in milligrams that is required to neutralize one gram of chemical substance. Unless stated otherwise, reference to the acid value is to the total acid value and is suitably measured in accordance with ISO 2114:2000(E) (method B) standard.

Molecular weight: References to both number average molecular weight and weight average molecular weight are made throughout. Number average molecular weight and weight average molecular weight are determined using gel permeation chromatography (GPC). Preferably, molecular weight is measured by comparison with a polystyrene standard. For instance, molecular weight determination may be conducted on a Hewlett-Packard 1050 Series HPLC system equipped with two GPC Ultrastyragel columns, 103 and 104 Å (5 μm mixed, 300 mm×19 mm, Waters Millipore Corporation, Milford, Mass., USA) and THF as mobile phase. The skilled person will appreciate that this definition of molecular weight applies to polymeric materials which typically have a molecular weight distribution. In the experimental work performed herein, theoretical number average molecular weight was calculated by end-group analysis (also referred to as chain end analysis) based on the carbonyl (i.e. ketone and/or aldehyde) content and the mass of the polymer and assuming carbonyl groups are present at each of two chain ends of the polymer.

Carbonyl content: Carbonyl content (i.e. ketone and/or aldehyde content) is preferably measured using quantitative $^{13}$C NMR spectroscopy. Preferably, carbonyl content is measured by comparison with a suitable calibration reagent, e.g., the end-capping reagent used to prepare the SC-PUD. For instance, a calibration curve can be prepared by running a number of $^{13}$C NMR experiments of known concentrations of end-capping reagent and integrating a specific carbon peak on the NMR spectra, e.g. the carbonyl peak. The same carbon integral of the polymer being investigated can then be compared to the calibration curve to provide the carbonyl content of the polymer. In the experimental work performed herein, carbonyl content is calculated from the number of moles of feedstock materials used to manufacture the SC-PUD.

Particle size/average particle size: In the context of the present invention, the terms "particle size" or "average particle size" refer to the volume distributed median particle diameter (equivalent spherical diameter corresponding to 50% of the volume of all the particles, read on the cumulative distribution curve relating volume % to the diameter of the particles—often referred to as the "D(v,0.5)" value). Particle size is preferably measured by laser light diffraction.

Resolubility of inkjet inks: Unless specified otherwise, resolubility is measured as follows. Approximately 60 μm ink layers were applied onto glass slides using a No.6 K-Bar (ex. RK Print). The ink film was then dried at 40° C. for 30 minutes. The dried ink was then immersed in an aqueous mixture comprising 25% (w/w) propylene glycol, 0.2% Tegowet KL245 (surfactant, ex. Evonik) and 0.15% (w/w) of triethanolamine, the rest being deionised water. This solution is a good simulation of the ink varnish. A highly resoluble ink will rapidly redissolve/redisperse into the immersion fluid, typically within 2 to 5 minutes, whereas an insoluble ink would fail to redisperse in the soaking solution within 60 minutes of immersion.

As will be understood by the skilled person, the terms resolubility and redispersibility are used interchangeably in the art to refer to the same ink property.

The present invention has been described in detail, including the preferred embodiments thereof. However, it will be appreciated that those skilled in the art, upon consideration of the present disclosure, may make modifications and/or improvements on this invention that fall within the scope and spirit of the invention.

NUMBERED PARAGRAPHS OF THE INVENTION

The invention is further described by the following numbered paragraphs.

1. An aqueous printing ink composition comprising a polyurethane dispersion, wherein the polyurethane of the polyurethane dispersion comprises the properties of (a) carbonyl groups present at one or more polymer chain ends; (b) a number average molecular weight ≤50,000, more preferably ≤25,000 and; (c) the content of carbonyl groups is in the range 0.02 to 4.0 mmol g−1, based on the dry polymer weight.

2. The composition of numbered paragraph 1, wherein the composition is selected from the group consisting of inkjet, flexographic and gravure inks.

3. The composition of numbered paragraph 1 or 2, wherein the polyurethane is predominantly linear in structure and the average number of carbonyl groups on the polymer is two or less.

4. The composition of any preceding numbered paragraph, wherein the polyurethane dispersion has an acid value of ≥10 mgKOH g−1 based on the dry polymer weight.

5. The composition of any preceding numbered paragraph, wherein the polyurethane dispersion has an average particle size of ≤200 nm, more preferably ≤150 nm.

6. The composition of any preceding numbered paragraph, wherein the polyurethane dispersion further comprises a reagent that may react with the carbonyl compounds to cure the composition.

7. The composition of numbered paragraph 6 in which the reagent is a difunctional, trifunctional or higher functional primary diamine, or dihydrazide, and where such reagent is preferably a difunctional reagent.

8. The composition of numbered paragraph 6 in which the difunctional reagent is adipic dihydrazide.

9. The composition of numbered paragraph 6 in which the reagent is a multivalent metal crosslinker, preferably a zirconium complex.

10. The composition of any preceding numbered paragraph, further comprising one or more acids selected from the group consisting of tartaric acid, gluconic acid, citric acid, maleic acid, succinic acid and salts thereof.

11. The composition of any preceding numbered paragraph, wherein the polyurethane of the polyurethane dispersion further comprises hydroxyl groups and where the hydroxy value of the polyurethane is preferably ≤100, and more preferably ≤50 mgKOH g$^{-1}$.

12. The composition of any preceding numbered paragraph, comprising ≤25% (w/w) of any blend of solvent with boiling points ≥150 oC and heats of vaporization ≥500 J g$^{-1}$.

13. The composition of any preceding numbered paragraph, comprising pigment dispersions prepared with anionic dispersants or non-ionic dispersants, or a blend thereof.

14. The composition of any preceding numbered paragraph, further comprising any additional polyurethane dispersion not satisfying the criteria of claim 1.

15. The composition of any preceding numbered paragraph, further comprising an additional styrene-acrylic dispersion.

16. A method for printing an article, comprising printing the composition of any one or more of numbered paragraphs 1-15 onto a substrate and curing.

17. The method of numbered paragraph 16, wherein the substrate is suitable for the printing of packaging, food packaging, metal substrates, textiles, decor laminates and graphics.

18. A printed article comprising the composition of any one or more of numbered paragraphs 1-15.

EXAMPLES

The invention is further described by the following non-limiting examples which further illustrate the invention, and are not intended, nor should they be interpreted to, limit the scope of the invention.

Materials

Daotan 6425: a conventional hydroxy-functional polyurethane dispersion, with a solid content of about 40% and a hydroxyl value of about 55 mgKOH/g (ex. Allnex).

Neorez R605: a conventional polyurethane dispersion, with a solid content about 33% and hydroxyl value of less than 5 mgKOH/g (ex. DSM Resins).

Daotan TW7064: a conventional self-crosslinking, ketone-containing, polyurethane dispersion, with a solid content of about 40% and no ketone groups are the polymer chain-ends (ex. Allnex).

Joncryl FLX5000: A self-crosslinking acrylic dispersion, with a solid content of about 42% (ex. BASF).

Joncryl FLX5060: A self-crosslinking acrylic dispersion, with a solid content of about 43%, and stated as having good resolubility for printing ink applications (ex. BASF).

Tegowet KL245: A surfactant (ex. Evonik).

Triethanolamine

Propylene glycol: A water soluble co-solvent, with a boiling point of about 188° C. and a heat of vaporization of about 880 J/g.

MMB (3-methoxy-3-methyl-1-butanol); A water soluble co-solvent, with a boiling point of about 174° C. and a heat of vaporization of about 384 J/g.

Cyan Pigment Dispersion A: An aqueous dispersion of cyan 15:3 pigment, comprising about 16% (w/w) pigment, and an anionic dispersant.

Cyan Pigment Dispersion B: An aqueous dispersion of cyan 15:3 pigment, comprising about 20% (w/w) pigment, and further comprising a non-ionic dispersant.

Carbodilite SV-02: A polycarbodiimide crosslinker (ex. Nishinbo Chemicals).

SC-PUDs Used in the Examples

Table 1 provides the details of the SC-PUDs used in the preparation of aqueous ink compositions suitable for inkjet compositions fulfilling the requirements of the invention previously laid out. All the SC-PUDs comprise the co-reagent adipic dihydrazide (1:1 molar ratio of SC-PUD to ADH), unless otherwise stated, to effect the cure of prints after drying. All the SC-PUDs used N,N-dimethylethanolamine as the neutralizing agent, other than SC-PUD C, which used triethylamine as the neutralizing base.

TABLE 1

Details of the SC-PUDs used in the Preparation of Aqueous Inks Suitable for Inkjet Printing

| SC-PUD (Inventive or Comparative) | Chain-end Ketone Groups | -OH Groups | pH | Solid Content (% w/w)[1] | Avg. Particle Size (nm) | Hydroxy Value (mgKOH/g); based on dry wt. | Carbonyl (Ketone) Content (mmol/g); based on dry wt.[2] | No. avg. Molecular Weight[3] | Wt. avg. Molecular Weight[4] |
|---|---|---|---|---|---|---|---|---|---|
| 1 (Inv.) | Yes | Yes | 7.6 | 40.1 | 25 | 27 | 0.360 | 5,600 | — |
| A (Comp.) | No | Yes | 7.3 | 40.0 | 30 | 29 | 0 | 5,600 | — |
| B (Inv.) | Yes | No | 7.6 | 40.1 | 41 | 0 | 0.354 | 5,600 | 10,400 |
| B1 (Inv.) (As B, but no ADH) | Yes | No | 7.7 | 39.7 | 40 | 0 | 0.354 | 5,600 | 10,400 |
| C (Inv.) | Yes | Yes | 7.4 | 40.5 | 3 | 27 | 0.356 | 5,600 | — |
| H (Comp.) | No | No | 7.8 | 40.0 | 357 | 0 | 0 | 5,600 | 10,600 |
| I (Inv.) | Yes | No | 8.2 | 39.8 | 129 | 0 | 0.652 | 3,100 | 7,700 |

Notes to Table 1:
[1]The SC-PUDs are aqueous dispersions.
[2]Carbonyl content is calculated from the number of moles of feedstock materials used to manufacture the SC-PUD.
[3]Number average molecular weight for the SC-PUDs was calculated on the basis of the carbonyl (i.e. ketone) content and an assumption that the polymer comprised carbonyl groups at both chain ends. In the case of SC-PUDs A and H these comparative examples were prepared using a chain terminating agent free of any carbonyl groups but otherwise using identical conditions to SC-PUD 1 and hence a theoretical number average molecular weight of 5,600 has been assigned.
[4]Weight average molecular weight for a number of the SC-PUDs was determined by GPC, using a polystyrene calibration and THF as the eluting solvent.

Tests

Viscosity of the inks was measured at 32° C. using a Brookfield DV-II+ Pro Viscometer equipped with Spindle no.18, at 100 rpm.

Resolubility Testing: Approximately 60 μm ink films were applied to glass slides using a No. 6 K-Bar applicator (ex. RK Print). The inks were then dried for 30 minutes at 40° C., before being immersed in an aqueous solution comprising 25% propylene glycol, 0.2% Tegowet KL245 and 0.15% of triethanolamine. Resolubility was assessed as: 'Highly Resoluble' (the dried ink film dispersed in the soaking fluid in less than 3 minutes, with no visible signs of any undissolved ink), 'Resoluble' (the dried ink film dispersed in the soaking fluid in 3 to 5 minutes, with no visible signs of any undissolved ink), 'Slowly Resoluble' (the dried ink film dispersed in the soaking fluid within 30 minutes, with no visible signs of any undissolved ink), 'Partially Resoluble' (the dried ink film disperses in the soaking fluid within 30 minutes, with visible signs of undissolved ink), 'Insoluble (the dried ink film shows little visible evidence of dispersing in the soaking fluid within 30 minutes).

Print Preparation: The inks were applied to white polyester coated steel plates at 8 μm, using a K-Bar applicator (ex. RK Print). The prints were then dried for 20 seconds using a hot air blower. The prints were allowed to stand at room temperature for a further 15 minutes before being tested for solvent resistance. The prints were then heated for 2 minutes at 50 and 75° C. and tested for solvent resistance. In a further test, prints were heated to 50° C. for 2 minutes before being allowed to stand at ambient conditions (22 to 25° C.) for one to seven days with the solvent resistance being assessed through this post-printing curing process.

Water Resistance: The water resistance of the prints was determined by rubbing the print with a cotton wool bud soaked in water. The number of double rubs required to remove or disrupt the print was the recorded; this is a test well known in the industry.

Table 2 shows the results for a number of comparative inks suitable for inkjet printing comprising polyurethane and acrylic dispersions not meeting the requirements of the invention. Also included in Table 2 are the results for inks comprising a hydroxy-functional PUD and a polycarbodiimide crosslinker, according to the teaching of US20180105710.

TABLE 2

| | Comparative Ink Examples[1] | | | | | |
|---|---|---|---|---|---|---|
| Ink Example | C1 | C2 | C3 | C4 | C5 | C6 |
| Resin Dispersion | Neorez R605 | Daotan TW7064 | Joncryl FLX5000 | Daotan 6425 | Daotan 6425 | Daotan 6425 |
| Carbodilite SV-02[2] | — | — | — | — | 2.0 | 4.0 |
| Ink Properties | | | | | | |
| Viscosity (mPa·s) | 5.28 | 5.61 | 6.99 | 5.76 | 6.33 | 6.57 |
| pH | 8.55 | 8.45 | 8.80 | 8.00 | 8.50 | 8.70 |
| Ink Resolubility | Insoluble | Insoluble | Insoluble | Highly Resoluble | Partially Resoluble | Insoluble |
| Print Properties; Water Resistance (Double Rubs) | | | | | | |
| 15 minutes at room temperature | 90 | >100 | >100 | 4 | 10 | 10 |
| 2 minutes at 50° C. | >100 | >100 | >100 | 20 | 35 | 40 |

TABLE 2-continued

| | Comparative Ink Examples[1] | | | | | |
|---|---|---|---|---|---|---|
| Ink Example | C1 | C2 | C3 | C4 | C5 | C6 |
| 2 minutes at 50° C., followed by 24 h. at room temperature | >100 | >100 | >100 | 50 | 80 | 90 |
| 2 minutes at 75° C. | >100 | >100 | >100 | 70 | 90 | >100 |

[1]Composition of inks in Table 2: 19.8% (w/w) deionised water; 25.0% (w/w) propylene glycol; 0.2% (w/w) Tegowet KL245; 30.0% (w/w) of the polymer dispersion; and 25.0% (w/w) of Cyan Pigment Dispersion A, wherein cyan pigment dispersion A is an aqueous pigment dispersion containing 16.7% pigment and around 5% dispersant or other suitable additives. For the examples comprising the polycarbodiimide crosslinker the amount of deionized water in the composition was reduced accordingly.
[2]Carbodilite SV-02 was added in 2.0% (w/w).
Note:
this general ink formulation is used for all of the examples in the application.

The results in Table 2 capture the issues that the invention resolves; how to produce aqueous printing inks, especially for inkjet printing, which provide the combination of ink properties (i.e., resolubility) along with print properties (i.e., the capacity to produce prints with good water resistance as demonstrated by double rubs). The conventional polyurethane and acrylic dispersions certainly produce resistant prints but the inks comprising them are highly insoluble. Contrariwise, the OH-PUD Daotan 6425 produces a highly resoluble ink but with poor print resistance. When the polycarbodiimide crosslinker is added to this ink, although there is an improvement in the print resistance, the resolubility is significantly compromised. Furthermore, Comparative Examples C5 and C6 produce prints that do not develop full water resistance after an initial drying of 50° C., followed by a post-cure period of 24 hours at room temperature.

Table 3 shows the results for inks prepared using the SC-PVDs described in Table 1, with SC-PUDs A and H, those without ketone groups as part of their polymeric structure constituting Comparative Examples 7 and 8. The inks were tested in the way previously described. As a further test, the stability of the inks was assessed by storing them for 7 days at 50° C. and remeasuring the viscosity. Instability would present itself typically as an increase in viscosity of greater than 10%. It is common for inks comprising PUDs to show a slight decrease in viscosity.

The results in Table 3 show the benefits of aqueous inks comprising the SC-PUDs. Comparing I1 with C7, and I2 with C8 shows the impact of removing the ketone functionality from the SC-PUD on the water resistance of the prints. All the Inventive Examples show an excellent balance of ink resolubility and print resistance especially for those inks comprising SC-PUDs containing the curing co-reagent ADH. It is interesting to note that Example I3, containing a ketone-functional SC-PUD, but without the ADH curative was still able to produce prints with a degree of water resistance, but not to the same level as I2, which is essentially the same SC-PUD but with the ADH curative co-reagent. A further observation is for Ink Example I4 comprising SC-PUD C, which is essentially the same as SC-PUD 1, but where the SC-PUD is neutralized with triethylamine, rather than N,N-dimethylethanolamine. This more volatile neutralizing amine has a slight negative impact on the ink resolubility but enables the print resistance to develop more quickly. This may well be due to the reaction between the ketone groups of the SC-PUD and ADH being retarded in the presence of the tertiary amine and consequently inks comprising SC-PUDs neutralized with less volatile amines such as N,N-dimethylethanolamine (with a boiling point of 134° C., compared with 89° C. for triethylamine) will cure more slowly. For promoting resolubility a further aspect of the invention is that any neutralizing tertiary amine should preferably have a boiling point of greater than 125° C.

It is conceivable that inks can be prepared using blends of an SC-PUD and other resins. Table 4 shows the results for

TABLE 3

| | Inks Comprising SC-PUDs | | | | | | |
|---|---|---|---|---|---|---|---|
| Ink Example | I1 (Inv.) | C7 (Comp.) | I2 (Inv.) | I3 (Inv.) | I4 (Inv.) | C8 (Comp.) | I5 (Inv.) |
| SC-PUD | 1 | A | B | B1 | C | H | I |
| | Ink Properties | | | | | | |
| Viscosity (mPa · s) | 6.78 | 5.82 | 6.00 | 5.82 | 6.63 | 6.24 | 5.52 |
| Viscosity after 1 week storage at 50° C. | 6.36 | 5.58 | 5.97 | 5.58 | 6.36 | 5.94 | 5.10 |
| % Viscosity Change | −6% | −4% | −0.5% | −4% | −4% | −5% | −8% |
| pH | 8.10 | 7.60 | 7.95 | 7.95 | 7.80 | 7.80 | 8.20 |
| Ink Resolubility | Highly Resoluble | Highly Resoluble | Highly Resoluble | Highly Resoluble | Resoluble | Highly Resoluble | Highly Resoluble |
| | Print Properties; Water Resistance (Double Rubs) | | | | | | |
| 15 minutes at room temperature | 10 | 10 | 80 | 10 | 35 | 2 | 30 |
| 2 minutes at 50° C. | 25 | 25 | >100 | 60 | 100 | 25 | >100 |
| 2 minutes at 50° C., followed by 24 h. at room temperature | >100 | 60 | >100 | 90 | >100 | 60 | >100 |
| 2 minutes at 75° C. | >100 | 80 | >100 | >100 | >100 | 90 | >100 | a number of inks prepared along these lines, the ink compositions following that previously outlined.

TABLE 4

Inventive Inks Comprising SC-PUDs and Resin Dispersions

| Ink Example | I6 | I7 | I8 | I9 | I10 |
|---|---|---|---|---|---|
| SC-PUD | 1 | 1 | 1 | 1 | 1 |
| Resin Dispersion | Daotan 6425 | Daotan 6425 | Neorez R605 | Joncryl FLX5000 | Joncryl FLX5000 |
| % (w/w) SC-PUD | 20.0 | 15.0 | 25.0 | 25.0 | 20.0 |
| % (w/w) Resin Dispersion | 10.0 | 15.0 | 5.0 | 5.0 | 10.0 |

TABLE 5

Impact of SC-PUD Concentration and Solvent Selection

| Ink Example | I1 | I11 | I12 | I13 | I14 | I15 | I15 | I16 | I17 | I18 |
|---|---|---|---|---|---|---|---|---|---|---|
| % (w/w) SC-PUD 1 | 30.0 | 30.0 | 30.0 | 30.0 | 25.0 | 20.0 | 30.0 | 30.0 | 30.0 | 30.0 |
| % Propylene Glycol | 25.0 | 15.0 | 10.0 | — | 15.0 | 15.0 | 12.5 | 10.0 | 7.5 | 5.0 |
| % MMB | 0 | 10.0 | 15.0 | 25.0 | 10.0 | 10.0 | 12.5 | 10.0 | 7.5 | 5.0 |
| Ink Properties | | | | | | | | | | |
| Viscosity (mPa · s) | 6.78 | 7.47 | 8.04 | 9.06 | 6.18 | 5.04 | 8.04 | 6.39 | 4.98 | 3.93 |
| pH | 8.10 | 8.05 | 8.05 | 8.05 | 8.10 | 8.10 | 8.05 | 8.10 | 8.10 | 8.10 |
| Ink Resolubility | Highly Resoluble | Highly Resoluble | Highly Resoluble | Resoluble | Highly Resoluble | Highly Resoluble | Highly Resoluble | Highly Resoluble | Highly Resoluble | Highly Resoluble |
| Print Properties; Water Resistance (Double Rubs) | | | | | | | | | | |
| 15 minutes at room temperature | 10 | 12 | 15 | 15 | 10 | 15 | 10 | 12 | 10 | 15 |
| 2 minutes at 50° C. | 25 | 25 | 30 | 35 | 30 | 40 | 30 | 30 | 60 | 70 |
| 2 minutes at 50° C., followed by 24 h. at room temp. | >100 | >100 | >100 | >100 | >100 | >100 | >100 | >100 | >100 | >100 |
| 2 minutes at 75° C. | >100 | >100 | >100 | >100 | >100 | >100 | >100 | >100 | >100 | >100 |

TABLE 4-continued

Inventive Inks Comprising SC-PUDs and Resin Dispersions

| Ink Example | I6 | I7 | I8 | I9 | I10 |
|---|---|---|---|---|---|
| Ink Properties | | | | | |
| Viscosity (mPa · s) | 6.45 | 6.36 | 6.18 | 6.36 | 6.15 |
| pH | 7.95 | 7.95 | 8.00 | 8.35 | 8.55 |
| Ink Resolubility | Highly Resoluble | Highly Resoluble | Partially Resoluble | Resoluble | Resoluble |
| Print Properties; Water Resistance (Double Rubs) | | | | | |
| 15 minutes at room temperature | 5 | 4 | 6 | 10 | 10 |
| 2 minutes at 50° C. | 20 | 20 | 45 | 50 | 80 |
| 2 minutes at 50° C., followed by 24 h. at room temperature | >100 | >100 | >100 | >100 | >100 |
| 2 minutes at 75° C. | >100 | >100 | >100 | >100 | >100 |

The results in Table 4 show that ink compositions can be prepared by combining SC-PUDs with other aqueous resins. In terms of the final print water resistance, there is no clear benefit in doing so and the excellent ink resolubility can be compromised. However, it will be understood by those skilled in the art that other resins may be used to enhance certain properties such as adhesion for example. The inventor has shown that ink examples I1 and I2 have excellent adhesion to a wide range of substrates including corona discharge treated PET and OPP films, acrylic coated PET film, and graphics substrates including acrylic, vinyl and polycarbonate. All the inks provided good adhesion to the coated steel plates used in the examples.

Aqueous compositions comprising various concentrations of SC-PUD and different solvent blends and concentrations are provided in Table 5. Again, the inks were prepared according to the formulation provided previously. Any differences in SC-PUD or solvent concentration were compensated for by the addition of further deionized water to the inks.

The results in Table 5 show that inventive compositions can be prepared with lower concentrations of the SC-PUD as well as alternative solvent blends and lower overall solvent concentration. A notable feature is how the drying response after 2 minutes at 50° C. increases for those inks containing 15% (w/w), or less, of propylene glycol. All the inks presented in Table 5 maintain high levels of resolubility. Also shown in Table 5 is that the addition of MMB allows for inventive compositions with a lower % of organic solvent (which is replaced with water). This decreased organic solvent content coupled with increased water content provides inventive ink compositions that are more environmentally friendly than the comparative ink compositions, while still achieving the desired performance properties.

All the examples described above used Cyan Pigment Dispersion A, a dispersion using an anionic dispersant in its preparation. The SC-PUDs also allow inks to be prepared having a good balance of ink resolubility and delivering good print resistance with pigment dispersions using non-ionic dispersants in their manufacture. To show this, further ink examples were prepared using Cyan Pigment Dispersion B and the details of these inks and the associated results are shown in Table 6.

TABLE 6

Inks Comprising a Pigment Dispersion prepared using a Non-Ionic Dispersant

| Ink Example | C9 | C10 | I19[1] | I20 |
|---|---|---|---|---|
| Resin Dispersion | Daotan 6425 | Joncryl FLX5060 | SC-PUD B | SC-PUD B |
| % (w/w) Cyan Pigment Dispersion B | 10.0 | 10.0 | 10.0 | 15.0 |
| Ink Properties | | | | |
| Viscosity (mPa · s) | 4.92 | 5.97 | 6.27 | 5.46 |
| pH | 7.80 | 8.65 | 7.70 | 7.75 |
| Ink Resolubility | Highly Resoluble | Insoluble | Highly Resoluble | Highly Resoluble |
| Print Properties; Water Resistance (Double Rubs) | | | | |
| 15 minutes at room temperature | 5 | 12 | 20 | 15 |
| 2 minutes at 50° C. | 8 | 30 | 85 | 50 |
| 2 minutes at 50° C., followed by 24 h. at room temperature | 15 | 90 | >100 | 100 |
| 2 minutes at 75° C. | 17 | 80 | >100 | >100 |

Ink formulations: 25.0% (w/w) of propylene glycol; 0.2% (w/w) of Tegowet KL245; 30.0% of the resin dispersion; and either 15.0 or 10.0% of Pigment Dispersion B. Deionized water formed the remaining balance of the inks.

[1]Inventive Example I19 further comprises 5.0% of MMB.

What can be seen from Table 6 is how much Pigment Dispersion B impacts the print water resistance compared with Pigment Dispersion A; C9 compared with C4. Inventive Ink Example I19 was highly resoluble yet was able to produce a print that developed excellent water resistance, more so than was achieved with Comparative Example C10 based on the conventional self-crosslinking acrylic dispersion Joncryl FLX5060. Furthermore, Comparative Ink Example C10 has very poor resolubility.

The invention claimed is:

1. An aqueous printing ink composition comprising a polyurethane dispersion, wherein the polyurethane of the polyurethane dispersion comprises the properties of (a) ketone or aldehyde groups present at one or more polymer chain ends; (b) a number average molecular weight ≤50,000, more preferably ≤25,000 and; (c) the content of ketone and aldehyde groups is in the range 0.02 to 4.0 mmol g$^{-1}$, based on the dry polymer weight.

2. The composition of claim 1, wherein the groups present at one or more polymer chain ends are ketone groups.

3. The composition of claim 1, wherein the polyurethane is predominantly linear in structure and the average number of ketone and aldehyde groups on the polymer is two or less.

4. The composition of claim 1, wherein the polyurethane dispersion has an acid value of ≥10 mgKOH g$^{-1}$ based on the dry polymer weight.

5. The composition of claim 1, wherein the polyurethane dispersion further comprises a reagent that may react with the ketone or aldehyde groups at the one or more polymer chain ends to cure the composition.

6. The composition according to claim 5 wherein curing occurs via linear chain extension.

7. The composition of claim 5 in which the reagent is a difunctional, trifunctional or higher functional primary diamine, or dihydrazide, and where such reagent is preferably a difunctional reagent.

8. The composition of claim 7 in which the difunctional reagent is adipic dihydrazide.

9. The composition of claim 1, wherein the polyurethane of the polyurethane dispersion further comprises hydroxyl groups and where the hydroxy value of the polyurethane is preferably ≤100, and more preferably ≤50 mgKOH g$^{-1}$.

10. The composition of claim 9, where the hydroxyl groups are present at one or more polymer chain ends.

11. The composition of claim 1, comprising ≤25% (w/w) of any blend of solvent with boiling points ≥150° C. and heats of vaporization ≥500 J g$^{-1}$.

12. The composition of claim 1, further comprising an additional styrene-acrylic dispersion.

13. The composition of claim 1, wherein the polyurethane is anionically stabilized by including a carboxylic acid into the polyurethane chain.

14. The composition of claim 13, wherein the anionically stabilized polyurethane is neutralized with a tertiary amine, potassium hydroxide or sodium hydroxide.

15. The composition of claim 14 wherein the anionically stabilized polyurethane is neutralized with a tertiary amine having a boiling point of greater than 125° C.

16. The composition of claim 14, wherein the anionically stabilized polyurethane is neutralized with triethylamine or N,N-dimethylethanolamine, preferably N,N-dimethylethanolamine.

17. A method for printing an article, comprising printing the composition of claim 1 onto a substrate and curing.

18. The method of claim 17, wherein the substrate is suitable for the printing of packaging, food packaging, metal substrates, textiles, decor laminates and graphics.

19. A printed article comprising the composition of claim 1.

* * * * *